(12) United States Patent
Warzecha et al.

(10) Patent No.: US 9,581,487 B2
(45) Date of Patent: Feb. 28, 2017

(54) TRANSPORT RAIL SYSTEM WITH WEIGHING MEANS COMPRISING A SENSOR FOR MEASURING A CHANGE OF A MAGNETIC PROPERTY

(71) Applicant: BAYERN ENGINEERING GMBH & CO. KG, Bad Aibling (DE)

(72) Inventors: Volker Warzecha, Bad Aibling (DE); Erich Kuehbandner, Bad Aibling (DE)

(73) Assignee: BAYERN ENGINEERING GMBH & CO. KG, Bad Aibling (DE)

( * ) Notice: Subject to any disclaimer, the term of this patent is extended or adjusted under 35 U.S.C. 154(b) by 0 days.

(21) Appl. No.: 14/782,946

(22) PCT Filed: Apr. 4, 2014

(86) PCT No.: PCT/EP2014/056815
§ 371 (c)(1),
(2) Date: Oct. 7, 2015

(87) PCT Pub. No.: WO2014/166834
PCT Pub. Date: Oct. 16, 2014

(65) Prior Publication Data
US 2016/0069733 A1     Mar. 10, 2016

(30) Foreign Application Priority Data

Apr. 8, 2013  (EP) .................................. 13162814

(51) Int. Cl.
*G01G 7/00* (2006.01)
*G01G 19/04* (2006.01)
(Continued)

(52) U.S. Cl.
CPC ............... *G01G 19/12* (2013.01); *G01G 3/15* (2013.01); *G01G 7/00* (2013.01); *G01G 19/047* (2013.01);
(Continued)

(58) Field of Classification Search
CPC . G01L 1/12; G01L 1/122; G01L 1/127; G01L 1/125; G01G 7/00; G01G 7/02; G01G 19/04–19/06; G01G 3/15
See application file for complete search history.

(56) References Cited

U.S. PATENT DOCUMENTS 2,571,718 A * 10/1951 Howes ..................... G01B 7/24
177/210 R
3,213,953 A * 10/1965 Flinth ....................... G01G 3/15
177/134
(Continued)

FOREIGN PATENT DOCUMENTS

CN     101368842 A     2/2009
DE          1133141 B     7/1962
(Continued)

OTHER PUBLICATIONS

PCT, International Search Report for International Application No. PCT/EP2014/056815.
(Continued)

*Primary Examiner* — Randy Gibson
(74) *Attorney, Agent, or Firm* — Manabu Kanesaka (57) ABSTRACT

Transport rail system capable of detecting a weight of a rail vehicle, includes one or more rails, and one or more sensors for measuring a magnetic property. At least one of the sensors is adapted to measure a change of a magnetic property in order to determine a weight bearing on one or more of the rails, the change of the magnetic property being caused by stress exerted on the rail by the weight, and one or more of the sensors are adapted to measure the change of a magnetic property of the rail itself and/or that one or more of the sensors are adapted to measure the change of a magnetic property of a supporting structure of the rail.

22 Claims, 6 Drawing Sheets

(51) Int. Cl.
   *G01G 19/06* (2006.01)
   *G01L 1/12* (2006.01)
   *G01G 19/12* (2006.01)
   *G01G 3/15* (2006.01)
   *G01L 1/22* (2006.01)

(52) U.S. Cl.
   CPC ............... *G01G 19/06* (2013.01); *G01L 1/22* (2013.01); *G01L 1/125* (2013.01); *G01L 1/127* (2013.01)

(56) References Cited

U.S. PATENT DOCUMENTS

| | | | | |
|---|---|---|---|---|
| 3,427,872 A * | 2/1969 | Leep | G01B 7/24 | 324/209 |
| 3,734,216 A * | 5/1973 | Nordstrom | G01G 3/1404 | 177/136 |
| 3,734,217 A * | 5/1973 | Flinth | G01G 19/04 | 177/163 |
| 3,741,327 A * | 6/1973 | Nordstrom | G01G 19/04 | 177/163 |
| 3,742,357 A * | 6/1973 | Kubo | G01L 5/045 | 324/209 |
| 3,747,715 A * | 7/1973 | Nordstrom | G01G 19/04 | 177/134 |
| 3,798,537 A * | 3/1974 | Dahm | G01L 5/045 | 324/209 |
| 3,861,203 A | 1/1975 | Dahle et al. | | |
| 3,861,206 A * | 1/1975 | Kawafune | G01L 3/102 | 324/209 |
| 4,170,268 A * | 10/1979 | Nordstrom | G01G 19/042 | 177/163 |
| 4,193,294 A * | 3/1980 | Forslund | G01L 1/127 | 73/862.69 |
| 4,200,855 A * | 4/1980 | Gilcher | B61K 9/12 | 246/249 |
| 4,363,369 A * | 12/1982 | Susor | G01G 3/1402 | 177/145 |
| 4,657,096 A * | 4/1987 | Angelbeck | G01G 19/047 | 177/134 |
| 4,802,368 A * | 2/1989 | Nordvall | G01L 1/127 | 336/20 |
| 4,920,806 A * | 5/1990 | Obama | G01B 7/24 | 324/209 |
| 4,977,783 A * | 12/1990 | Pratt | B66C 13/16 | 73/862.392 |
| 5,243,146 A * | 9/1993 | Nishitani | G01G 19/08 | 177/136 |
| 5,437,197 A * | 8/1995 | Uras | G01L 1/127 | 73/862.69 |
| 5,456,119 A * | 10/1995 | Nakazaki | G01L 5/0004 | 177/136 |
| 5,739,757 A * | 4/1998 | Gioutsos | B60K 28/04 | 177/144 |
| 5,894,409 A * | 4/1999 | Tanaka | G01G 19/08 | 174/254 |
| 6,653,578 B1 * | 11/2003 | Gassmann | G01G 19/045 | 177/163 |
| 6,941,824 B2 * | 9/2005 | Morelli | G01L 1/127 | 73/862.69 |
| 7,152,491 B2 * | 12/2006 | Gloutsos | G01G 19/4142 | 73/862.325 |
| 2003/0089530 A1 * | 5/2003 | Paine | G01G 19/047 | 177/163 |
| 2003/0131672 A1 * | 7/2003 | Norling | G01L 1/127 | 73/862.627 |
| 2004/0079175 A1 * | 4/2004 | Dukart | B60N 2/002 | 73/862.391 |
| 2005/0103128 A1 * | 5/2005 | Dukart | G01G 7/02 | 73/862.626 |
| 2006/0028205 A1 * | 2/2006 | Buttle | G01L 1/12 | 324/217 |
| 2010/0013465 A1 * | 1/2010 | Sautter | B41F 21/00 | 324/207.11 |
| 2012/0126833 A1 * | 5/2012 | Dooley | G01N 3/066 | 324/657 |
| 2014/0184210 A1 * | 7/2014 | Campbell | G01L 1/122 | 324/209 |

FOREIGN PATENT DOCUMENTS

| | | |
|---|---|---|
| EP | 2 397 830 A2 | 12/2011 |
| GB | 941963 | 11/1963 |
| JP | S49-028383 A | 3/1974 |
| JP | H11-258028 A | 9/1999 |
| JP | 2001-281074 A | 10/2001 |

OTHER PUBLICATIONS

Shi, Y. Et Al., "Application of the Attached Force Sensor Based on Magnetoelastic Effect in the Dynamic Weighing Rail," Acta Metrologica Sinica, Oct. 2007, p. 360-364, vol. 28, No. 4, China Academic Journal Electronic Publishing House.

Japan Patent Office, Office Action for Japanese Patent Application No. 2016-506859, Aug. 23, 2016.

Shi, Y. et al., "New Stress Measurement Method for Dynamic Weigh Rail," Instrument Technique and Sensor, Apr. 30, 2011, p. 76-79, No. 4, China.

* cited by examiner

TRANSPORT RAIL SYSTEM WITH WEIGHING MEANS COMPRISING A SENSOR FOR MEASURING A CHANGE OF A MAGNETIC PROPERTY

RELATED APPLICATIONS

The present application is National Phase of International Application No. PCT/EP2014/056815 filed Apr. 4, 2014, and claims priority from European Patent Application No. 13162814.1, filed Apr. 8, 2013, the disclosure of which is hereby incorporated by reference herein in its entirety.

FIELD OF THE INVENTION

The invention relates to a transport rail system capable of detecting a weight of a rail vehicle, the transport rail system comprising one or more rails, and one or more sensors for measuring a magnetic property, wherein at least one of the sensors is adapted to measure a change of a magnetic property in order to determine a weight bearing on one or more of the rails, the change of the magnetic property being caused by stress exerted on the rail by said weight.

BACKGROUND OF THE INVENTION

In the laid open document DE 11 33 141 an apparatus for determining the weight of railway vehicles is described. This apparatus determines the weight of such vehicles by measuring the pressure exerted by the wheels onto the rails using at least two strain sensors positioned in series along the bottom side of the rail.

Patent specification DE 12 62 628 shows a device for weighing rolling stock. In this invention the weight of a rolling railway wagon is measured on a weighing stretch of rail that can freely move in vertical direction. The vertical displacement is translated into a measurement signal by two pressure sensing means comprising a magnetostrictive core.

In patent application CN 101 36 88 42 A, a track dynamic weighing method is disclosed. It features a weighing method using two weighing points, which have equal distance from two fulcrums on a weighing track. A sensor which adopts a three-pole E-shaped integral iron core measures the force borne by the track exploiting the counter magnetostrictive effect in an amorphous alloy thin film layer attached to the measurement points on the central axis of the lateral side of the rail. This thin layer of amorphous alloy is located between the detector iron core and the rail itself.

In patent specification GB 941,963 improvements in or relating to railway vehicle weighing machines are described. Such a weighing machine comprises at least three strain responsive devices, which detect the bending moments at three different places within the spacing of two sleepers of a rail over which a railway rail vehicle passes.

From the laid open document EP 2 397 830 A2 a torque and force measurement system is known for measuring torque and/or force impact on a corpus. The corpus may for example be a bicycle drive shaft or a wind turbine shaft. A field generator arrangement, which comprises a coil wound around a ferromagnetic flux concentrator, applies a magnetic field to the corpus. The coil may be powered by a DC or an AC signal, for example with a frequency between 200 Hz and 1000 Hz. The corpus modifies the morphological structure due to the torque and/or force impact so as to influence the generated field. This modification can be determined by a magnetic field sensor arrangement which may likewise comprise a coil and a flux concentrator.

Problem to be Solved by the Invention

It is an object of the present invention to improve a transport rail system. For instance, a transport rail system with a weighing system that can be installed more easily, that can be obtained at a lower price or that can have a reduced complexity shall be provided.

Solution According to the Invention

According to the invention the problem is solved by a transport rail system, wherein one or more of the sensors are adapted to measure the change of a magnetic property of the rail itself and/or one or more sensors are adapted to measure the change of a magnetic property of a supporting structure of the rail.

In the sense of this invention a transport rail system is a rail system which allows the transport of a rail vehicle from one point of the rail to another on a predefined path. Such a rail vehicle can for example be a rail car, a locomotive, a lorry, a trolley or a train set formed by a multiplicity of carts. A transport rail system can be found indoors as well as outdoors. It can be installed for example in a warehouse as a goods transport system or outdoors as a railroad track. In the present case a transport rail system allows the transport by guiding the rail vehicle either hanging on the rail system, so that the rail vehicle moves below and/or between the rail height level, or standing on the rail system, so that the rail vehicle moves above the rail height level.

According to this invention a rail is a beam that carries a rail vehicle on a predefined track in the transport rail system. In the sense of this invention, the rail having weighing means is not a separate part of the track, but an integral part of the track. That means it is not mechanically disconnected from the part of the transport rail system that is not adapted for detecting a weight of the vehicle. Furthermore according to this invention a supporting structure is a structure that carries the rail. A supporting structure can for example be a sleeper of a railroad track, a scaffold, a rack, or a beam which stabilises the rail in a desired position, for example on the ground, a scaffold, on a wall or from a ceiling.

By measuring the weight effect on a magnetic property of the rail itself and/or by a supporting structure of the rail additional materials like special alloys between the sensor and the rail of the supporting structure previously found necessary may surprisingly be omitted. Thus the price and the complexity of such a transport rail system capable of detecting a weight of a rail vehicle may be reduced. Further advantages may be obtained by preferred embodiments of the invention which are discussed below.

The different sensors described below are merely examples for suitable sensor designs for use with the present invention; in principle, any sensor that is sensitive enough to utilize, as a measurement signal, the change of a magnetic property of the rail itself or of the support structure of the rail due to load on the rail may be suitable for use as a sensor in the present invention, preferably those types of sensors that are adapted to pick up a changing magnetic field, for example through pickup coils.

For a sensor to measure the change of a magnetic property of the rail or the support structure means that the majority, i.e. more than 50%, of the magnetic property change as registered by the sensor stems from a change of a magnetic property of the rail or the support structure, respectively.

Preferably, more than 70%, more preferably more than 80%, more preferably more than 99%, more preferably the entire magnetic property change as registered by the sensor stems from a change of a magnetic property of the rail or the support structure, respectively. This is in contrast to arrangements where mainly the change of a magnetic property of a part other than the rail or the support structure is measured, e.g. that of an amorphous alloy thin film layer as disclosed in CN 101 36 88 42 A. In the present invention one may think of the rail itself or its support structure as part of the measurement arrangement of the sensor, preferably part of a pole core.

PREFERRED EMBODIMENTS OF THE INVENTION

In a preferred embodiment of the transport rail system the system comprises two or more sensors adapted to measure the change of the magnetic property. In an embodiment the sensors are on the same surface of the transport rail system while having the same measurement orientation. If the weight exerts a stress on the rail, the rail bends. The lower the weight borne by the rail, the less bending of the rail may occur, which also may lower the effect on the magnetic property. Thus it may be useful to extend the length of the rail on which the weighing shall occur by having several sensors along that section of the rail. For example, two, three, four, five, six, seven, eight, nine or ten sensors may be arranged along a section of the rail, preferably equidistantly with respect to each other. The distance between two adjacent sensors preferably is larger than one centimeter, more preferably larger than two centimeters, more preferably larger than three centimeters, more preferably larger than five centimeters, more preferably larger than ten centimeters, more preferably larger than 20 centimeters, more preferably larger than 30 centimeters. The distance preferably is smaller than 20 meters, more preferably smaller than ten meters, more preferably smaller than one meter, more preferably smaller than 90 centimeters, more preferably smaller than 50 centimeters, more preferably smaller than 30 centimeters. Thus, in some embodiments of the invention, the distance between two adjacent sensors is for example between 20 centimeters and 90 centimeters. In some embodiments the distance is smaller than ten centimeters. In some embodiments, the distance is larger than one meter, more preferably even larger than ten meters. In general it is preferred that the measurement occurs on a length of the rail along the distance over a multitude of supporting points of the rail, preferably along the distance over two, three, four, five, six, seven, eight, nine or ten supporting points which most preferably are sleepers of a railroad track. In some embodiments a single sensor can be sufficient, for example if the weight is comparably large or the rail or support structure bends comparably easily. By that the costs of providing such a system may be reduced.

In another embodiment it is preferred that the transport rail system comprises two or more sensors adapted to measure the change of the magnetic properties on two surfaces of different orientation. As different components of the stress being effective in different directions of the rail (for example stress/strain) lead to different changes in the magnetic field, multiple sensors can be used to calculate the weight bearing on the rail or the supporting structure. The sensors on the different surfaces may be installed with an offset with respect to each other, preferably having an offset along the rail. For example, three sensors may be mounted on a base surface of the rail with a distance between each other and three additional sensors may be mounted on a lateral surface of the rail in intermediate positions with respect to the sensors on the base surface, mutatis mutandis for the supporting structure of the rail.

In a preferred embodiment, the system comprises two or more sensors adapted to measure the change of a magnetic property either of the rail itself or of a supporting structure of the rail and at least two of those sensors are mounted in a way to measure the change of the magnetic property in different measurement directions, the measurement directions having an angle larger than zero between each other. This embodiment is preferred to be applied on railroad tracks. For example, the angle between the measurement directions of two sensors in the transport rail system is larger than 5, preferably larger than 10, more preferably larger than 40, more preferably larger than 60 degrees, for example between 80 and 100 degrees. In some embodiments at least two of those sensors are mounted in a way to measure the change of the magnetic field in a direction perpendicular towards each other. As train wheels often have tilted running surfaces, they exert forces on the rails both towards the ground and parallel to the ground. To adapt to the design of the running surfaces the rails are often tilted inward. In such cases, having two sensors measuring in directions having an angle between each other may result in an increased precision.

In a preferred embodiment one or more sensors comprise one or more measurement arrangements for measuring the magnetic property; a measurement arrangement is the part of the sensor that is adapted to sense a signal being changed by the change of the magnetic property. Typically, a measurement arrangement comprises a coil, preferably a coil surrounding a core. Preferably, a surface of the coil or of an integral pole core is in direct mechanical contact with the respective element of the transport rail system whose magnetic property to be measured changes. Having direct contact between the measurement arrangement for measuring the magnetic property and the element whose magnetic property to be measured changes may allow collecting an especially strong signal from the rail, so that this embodiment is highly preferred.

A sensor suitable for being used in embodiments of the present invention is for example shown and described in EP 2 397 830 A, depicted for example in FIGS. 10 and 15 of that document. Regarding the sensor design and the necessary measurement electronics, that document is incorporated by reference in the specification of the present invention. While in the embodiments shown in EP 2 397 830 A the measurement arrangement, comprising a core and a coil surrounding the core, is mounted at a distance from the corpus to be measured, in the present invention in some embodiments the measurement arrangement, preferably the core, may have a surface having direct mechanical contact with the corpus, namely the rail or the support structure. Another sensor having such measurement arrangement and being suitable for use in embodiments of the present invention is shown and described in CN 101 368 842 A, for example in FIGS. 2 and 3 shown in that document. Regarding the sensor design, the document is incorporated by reference in this description as well. In contrast to the present invention, according to this prior art document neither the measurement coils nor their pole cores are in direct contact with the rails or their supporting structure via one of its surfaces, but the measurement arrangements of the sensor are in contact via integral pole cores with an alloy that exhibits a strong inverse magnetostrictive effect that is measured instead of the effect present in the rail or the support structure itself.

With the present invention, the alloy layer can be omitted, so that the complexity and the price of such a transport rail system may be lowered.

In a preferred embodiment of the transport rail system one or more sensors comprise one or more measurement arrangements for measuring the magnetic property, the measurement arrangements having an air gap between itself and the respective element of the transport rail system whose magnetic property to be measured changes. Having an air gap is equivalent to an embodiment of a contactless weighing system. Preferably a sensor as known from EP 2 397 830 A is used. While this prior art document describes the use of the sensor for torque and force measurement, the sensor may just as well be used for measuring weight, as a weight load on a corpus will also result in a change in morphology of the corpus and thus in a change of a magnetic property in the ferromagnetic corpus. As demonstrated in the prior art document, the measurement coil and core as part of the measurement arrangement may be mounted at a distance, i.e. with an air gap, from the corpus to be measured in order to pick up a magnetic field. In some embodiments, a sensor of the type known from CN 101 368 842 A is mounted with its measurement arrangement at a distance from the element whose magnetic property to be measured changes. This may allow providing a sensor that is not mounted to the rail and possibly not even to the supporting structure, so that the rail or a supporting structure can be replaced without having to replace the sensor itself. Accordingly, in a particularly preferred embodiment there is an air gap between the whole sensor and the element whose magnetic property to be measured changes. In certain embodiments the air gap may be partially or completely filled with a material bridging the gap. This material may be a glue. Another suitable material is a magnetic compound for fixing the sensor to the rail or the support structure removably. The layer bridging the gap or the air gap may measure for example 100 μm or more, especially in cases where the sensor is sensitive enough, or less than 50 μm, especially in cases where the sensor has a rather low sensitivity, so that it is preferred to keep the distance between rail or support structure and measurement coil low while still a contactless measurement is desired.

Preferred is that one or more of the rails have a supporting structure and the sensor is adapted to measure the change of a magnetic property of the supporting structure of the rail caused by stress exerted on that rail by said weight. With this embodiment, it may become possible to replace the rail in case of a defect while the sensor can stay in place. An achievable advantage is that handling time is reduced, especially in cases where the rails have to be replaced regularly.

In a preferred embodiment at least one or more of the rails have one or more sensors mounted to them which are adapted to measure the change of a magnetic property of said rail caused by stress exerted on that rail by said weight. This embodiment may have the advantage that rail and sensor can be produced together and can be deployed as a set later on. Thus expert knowledge that can be necessary to mount and calibrate the sensors on the rail can be concentrated at one side while in the field only conventional knowledge about railway construction is needed. In some settings it is desirable that in addition at least one of the rails has a supporting structure and at least one additional sensor is adapted to measure the change of a magnetic property of the supporting structure of the rail caused by stress exerted on that rail by said weight. Thus the change of the magnetic property caused by the stress exerted on the rail can be measured at different locations, which may lead to an increased precision.

Furthermore it is preferred that one or more sensors adapted to measure a change of a magnetic property caused by stress exerted on the rail is arranged on the rail in an intermediate position between two supporting points of a supporting structure of the rail. This can be particularly useful as the rail may be most pronounced between two supporting points. Thus, it is most preferred that a sensor is placed exactly half way between two supporting points. A preferred supporting point is the mounting point of the rail at a sleeper of a railroad track, a scaffold, a rack, a ceiling or a beam. In other embodiments sensors may additionally or alternatively be placed at supporting points of the supporting structure of the rail. This can reduce the installation time as manual work necessary to install the sensors can be performed while the rail is mounted to the supporting point.

It is preferred that the physical effect underlying the change of the magnetic property to be measured by the sensors is the inverse magnetostrictive effect. The inverse magnetostrictive effect allows the weight bearing on a rail to be calculated based on the change of the magnetic susceptibility of an element of the transport rail system due to stress on the rail, for example the rail itself or a supporting structure of the rail. While previously it was thought that the effect on the rail itself or a supporting structure of the rail is too weak to be measured, recent development in sensor technology allows direct measurement of the effect in conventional rails or support structures, like railroad rails or ferromagnetic steel beams for supporting structures. Thus potentially expensive additional materials like alloys with large inverse magnetostrictive characteristics between the rail and the sensor can be omitted. This may lower costs and reduce complexity of such transport rail systems with weighing capabilities.

Preferably the transport rail system has two or more rails arranged in parallel to each other. In this case a preferred transport rail system can be a railroad track system. The determination of weight of trolleys, locomotives or lorries or railroad carts is often necessary in the industrial sector. Thus having such an enhanced transport rail system can be of great advantage. With previously known transport rail systems having weighing means and being applied for railroad tracks rather complex setups were necessary, involving cutting holes to the rails for mounting magnetic sensors or cutting parts of the rail for providing mechanical weighing apparatuses. In contrast to these solutions, the present transport rail system may allow measurement of the weight without damaging the rail or the supporting structure of the rail. Accordingly, applying the present system to a railroad track can be remarkably easy and reduces the amount of manual work needed to install the sensors to the rail or the supporting structure. Thus installing the weighing system can reduce both the necessary working time as well as the costs.

In a transport rail system with two or more rails arranged in parallel to each other, preferably at least one sensor is arranged on each rail. This is advantageous because typically the weight of a rail vehicle does not weight equally on both rails, and his fact can be accounted for by measuring the weight on both rails. Preferably, the two sensors lie on a straight line which extends perpendicularly to the longitudinal extension of the parallel rails. Further Sensors may be arranged on each rail and preferably, these sensors, too, are arranged in pairs, each pair lying on a straight line which extends perpendicularly to the longitudinal extension of the parallel rails.

In another preferred embodiment, the transport rail system is a monorail system. That means it comprises exactly one rail carrying the vehicle. A monorail can be advantageous for the use in warehouses or the like. Systems with only one rail allow a very easy implementation of weight measurements through the measurements of change of a magnetic field. Under ideal conditions in such systems bending occurs in one predictable dimension only. Thus this is one possible case in which exactly one sensor can be used to come to reliable and reproducible weighing results. In other cases, for example where bending forces in more than one direction occur or where bending effects over a longer distance of the rail shall be detected, more than one, preferably two or more, more preferably four, five, six, seven or eight sensors may be present, for example measuring a change of the field strength in different directions or for collecting an extended bending profile.

The transport rail system can be designed in a way that the element of the transport rail system whose magnetic property changes due to the applied stress comprises or consists of ferromagnetic steel. Preferably the element comprises at least 10%, more preferably at least 20%, more preferably at least 30%, more preferably at least 40%, more preferably at least 50%, more preferably at least 60%, more preferably at least 70%, more preferably at least 80% or even more preferably at least 90% of ferromagnetic steel. Preferably the element comprises up to 10%, more preferably up to 20%, more preferably up to 30%, more preferably up to 40%, more preferably up to 50%, more preferably up to 60%, more preferably up to 70%, more preferably up to 80%, more preferably up to 90% or even more preferably up to 100% of ferromagnetic steel. That means for example that the element may comprise more than 40% but less than 70% of ferromagnetic steel. For example, inverse magnetostriction occurs when a mechanical load deforms a ferromagnetic material. Thus lager amount of ferromagnetic steel may result in an increased signal resulting from the magnetic field. Alternatively any other type of ferromagnetic material can replace ferromagnetic steel to achieve a signal of a change in a magnetic field. In the view of the desired measurements it is preferred that either the rail itself or the support structure of the rail features the mentioned amount of ferromagnetic material, preferably ferromagnetic steel.

In a preferred embodiment at least one rail of the system is permanently magnetised. This allows providing a transport rail system with a so called passive sensor technology. "Passive sensor technology" means that means for actively generating a magnetic field may be omitted, preferably omitted from the sensor. Thus the sensor only needs to be equipped with at least one measurement coil as a pick-up coil to measure the change in the magnetic field of the rail caused by stress due to a weight barring on the rail. This may result in lowered costs. Alternatively an "active sensor technology" may be used in which a rail becomes magnetised once a weight measurement shall occur. Such active sensors are for example shown and described in CN 101 368 842 A and EP 2 397 830 A. In the case of an active sensor technology the sensor preferably comprises means for emitting a magnetic field which is induced into the objective rail or support structure, for example a coil for generating a magnetic field. Such means are for example shown and described in EP 2 397 830 A. This document discloses a coil surrounding a core for generating a magnetic field. Thus, concerning the field generating process and the properties and settings of the sensor electronics, that document is incorporated into this description by reference. An achievable advantage of the active sensor technology is that no permanent magnetisation of the rail is necessary. Of course the support structure may—mutatis mutandis—also be permanently magnetised to allow a passive measurement and the means for emitting a magnetic field in the active case may also be provided as means separate from the sensor.

Preferably one or more sensors for measuring a magnetic field of the transport rail system are removably mounted to the system. Such a set up allows quick mounting and un-mounting of the sensors on the transport rail system, for instance on the rail or on the supporting structure of the rail. The sensors may be fixed to the rail in a non-permanent way so that easy removal is possible, for example if the rail or the supporting structure has to be replaced or if the sensor shall be installed at another rail in a different location. This may reduce maintenance time or costs.

BRIEF DESCRIPTION OF THE DRAWINGS

The invention is illustrated in greater detail with the aid of schematic drawings.

DETAILED DESCRIPTION OF EMBODIMENTS OF THE INVENTION

FIGS. 1 to 6 show embodiments of transport rail systems 1 according to the invention or elements which can be of importance for such transport rails systems 1.

Figure 1:
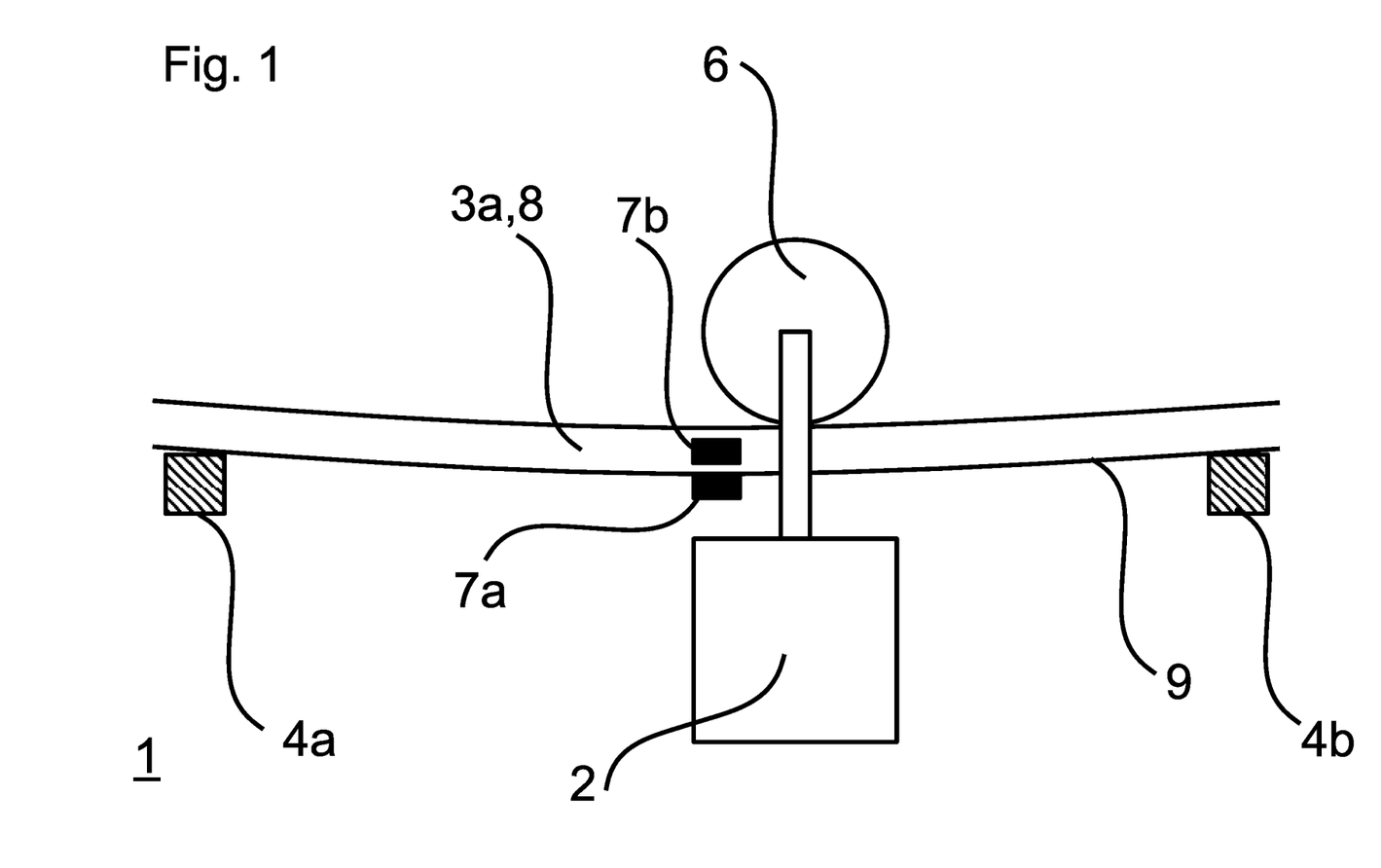
FIG. 1 shows a sideview of a transport rail system according to an embodiment of the invention.
Figure 2:
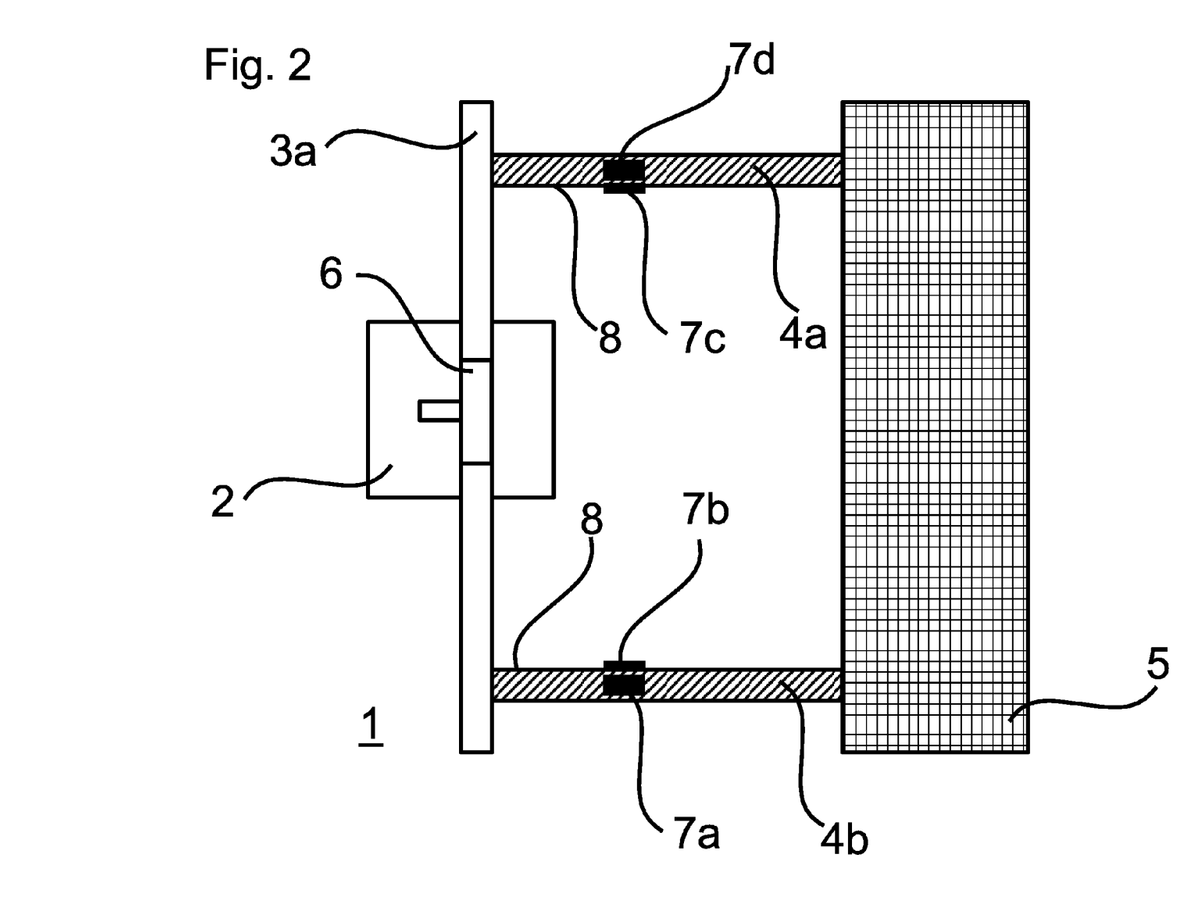
FIG. 2 shows a top view of another embodiment of the invention.
Figure 3:
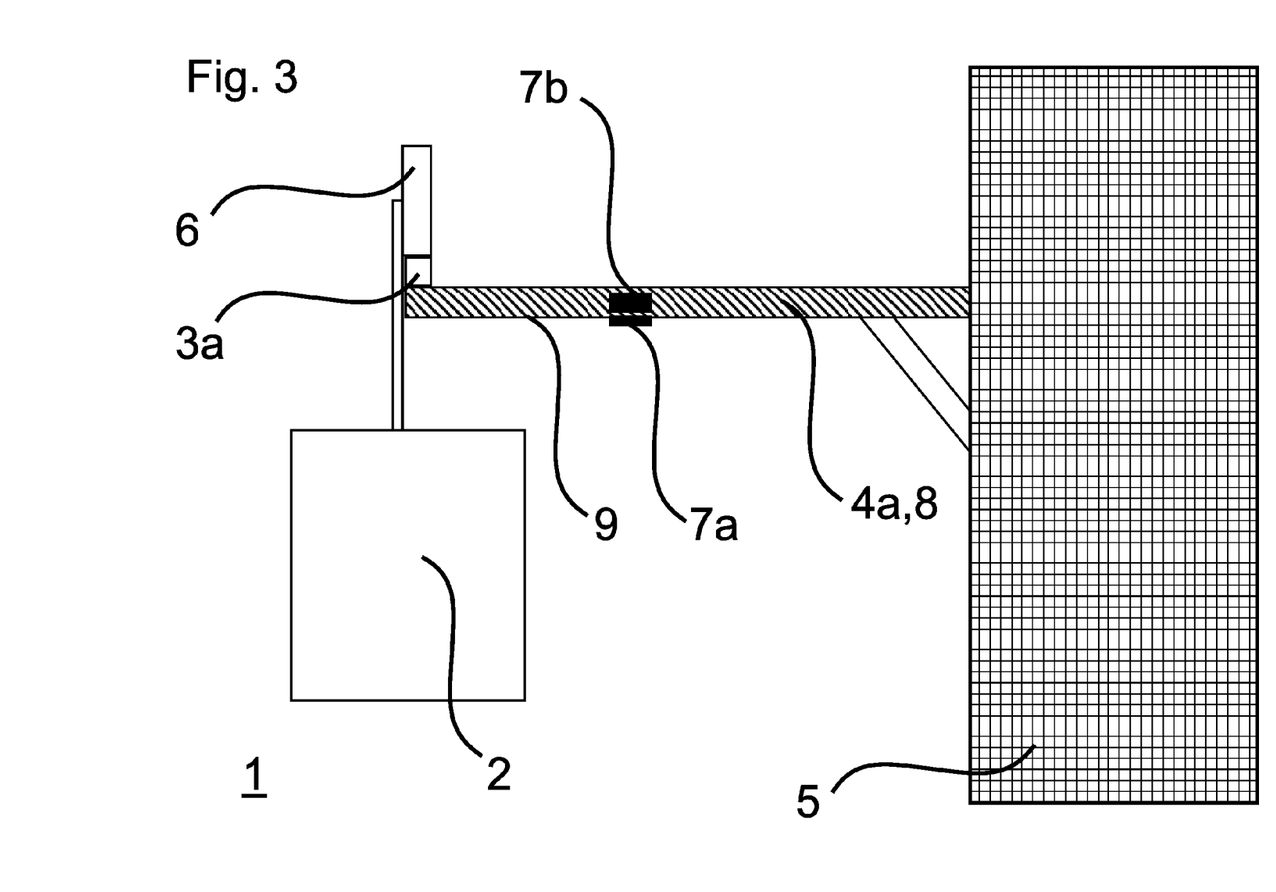
FIG. 3 shows a front view along the rail of the embodiment of the invention according to FIG. 2.

FIG. 1 shows a transport rail system 1 capable of detecting a weight of a rail vehicle 2. In this case it is a monorail system, the rail 3a being supported by a first beam 4a and a second beam 4b. The first beam 4a and the second beam 4b are mounted to a wall 5 as can be seen in FIGS. 2 and 3. The rail 3a was cast from a metal alloy and comprises ferromagnetic steel.

A heavy rail vehicle 2 having a single wheel 6 and carrying a payload travels along the rail 3a and by the gravitational force generated by its mass the rail 3a as well as the supporting beams 4a, 4b are deformed. As indicated in FIG. 1, a first and a second sensor 7a, 7b are positioned on a lateral surface 8 as well as on a base surface 9 of the rail 3a at a measurement point, the measurement point being equidistantly positioned from the first beam 4a and the second beam 4b. That means in other words that the rail 3a has two sensors 7a, 7b mounted to it which are adapted to measure the change of a magnetic property of that rail 3a caused by stress exerted on that rail 3a by said weight. The sensors 7a, 7b are arranged on the rail 3a in an intermediate position between two supporting points, formed by the two supporting beams 4a, 4b, of a supporting structure of the rail 3a.

Figure 4:
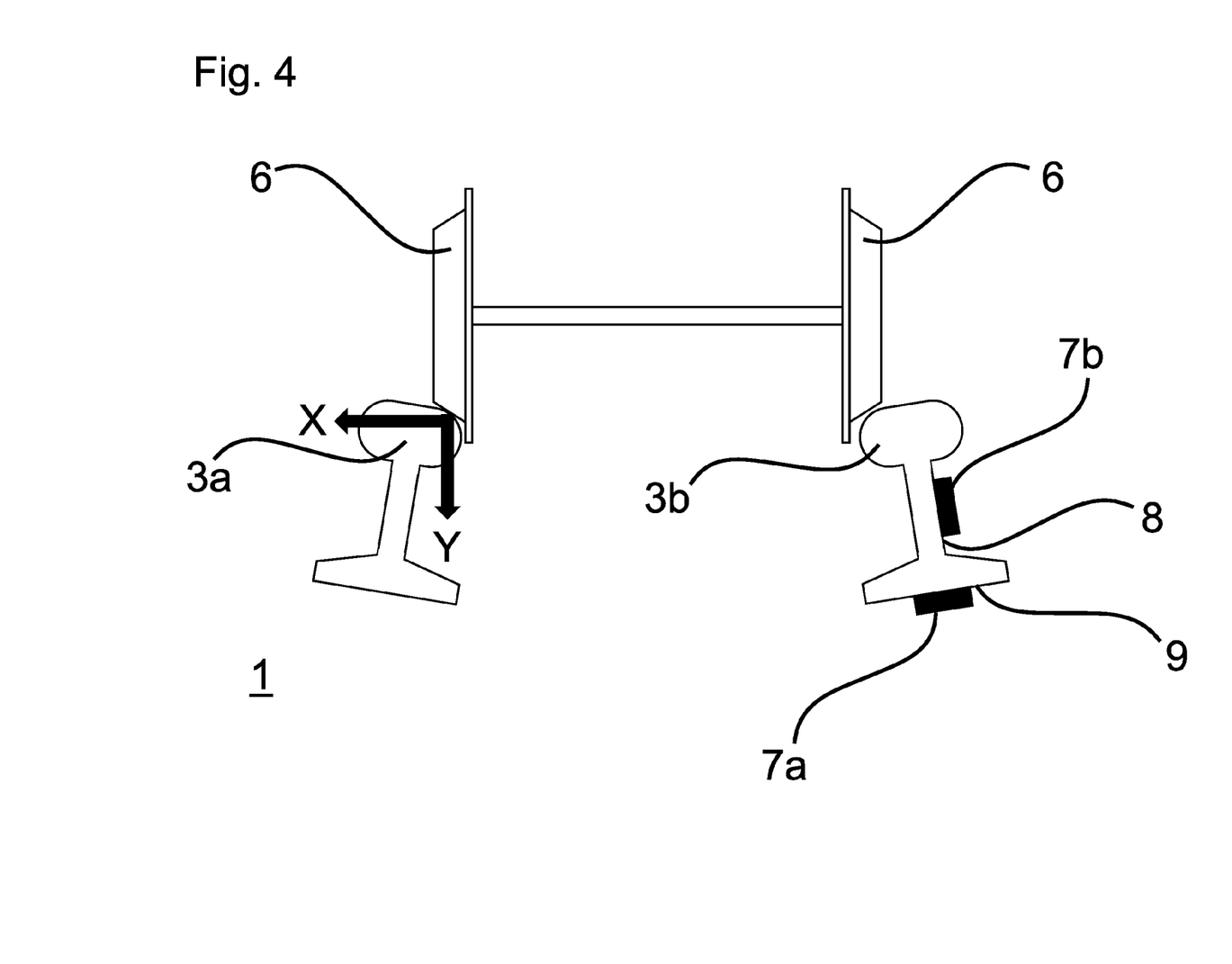
FIG. 4 shows a front view of another embodiment of the invention in which the transport rail system has two rails.

While in the ideal situation the monorail system bends only in a single dimension, in some cases the rail 3a will experience bending in different directions. Thus, two sensors measuring the change of the magnetic property in different measurement directions, the measurements directions having a non-zero angle between each other, are provided. By placing sensors 7a, 7b on the base surface 9 and the lateral surface 8 of the rail 3a orthogonally with respect to each other, the stresses in the material can be measured in orthogonal directions, which may be one way of increasing the measurement accuracy and precision. This method can be extended by placing a multitude of sensors 7 along the rail 3a and can also be applied for transport rail systems 1 with more than one rail 3a, for example in railway systems as depicted in FIG. 4. In other embodiments, the measurement directions may have an angle of for example 45 degrees between each other, so that a measurement of different non-collinear components of the magnetic property may be performed in geometries different from the one described above. In embodiments having two or more rails 3a, 3b as shown in FIG. 4, sensors 7 are preferably provided at each rail 3a, 3b so that the different loads bearing on each rail 3a, 3b can be measured separately.

Another embodiment of the invention is shown in FIG. 2 and FIG. 3. FIG. 2 is a top view of that embodiment along the direction of the gravitational force. FIG. 3 is a front view of that embodiment viewed along the rail 3a. Here the bending of two successive supporting beams 4a and 4b is measured by two pairs of orthogonally placed sensors 7a to 7d (again, in other embodiments of the invention, the sensors may be placed at a different angle to each other). The rail 3a has a supporting structure formed by the supporting beams 4a, 4b and the sensors 7a to 7d are adapted to measure the change of a magnetic property of the supporting structure of the rail caused by stress exerted on that rail 3a by said weight.

The rail vehicle 2 travels along the rail 3a and comes to a position in between the two support beams 4a, 4b being equipped with the sensor pairs which detect the strain and stress in each of the support beams 4a, 4b respectively. After a calibration, for example a calibration run with a rail vehicle 2 of known mass, the generated electrical signals can be used to infer the mass of a rail vehicle 2 with unknown mass. It is not necessary to stop the vehicle 2 for weighing. Thus weighing can take place while the rail vehicle 2 travels, allowing a faster completion of the desired transport.

In yet another embodiment of the invention, which is shown in FIG. 4., we consider a system of two rails 3a, 3b which are arranged in parallel to each other, as for example in the case of railway tracks. The weight of the rail vehicle 2 (not shown in this figure) is carried by both rails 3a, 3b simultaneously but is not necessarily distributed equally on both rails. Hence, to determine the weight of the rail vehicle 2, sensors 7a, 7b may be placed on each rail 3a, 3b. In the given case, a pair of sensors 7a, 7b is placed on one rail 3b only. In the case of railroad rail vehicles 2, the force applied on the rail 3b by the weight of the rail vehicle 2 has components in both directions perpendicular to the longitudinal direction of the rail, both being perpendicular to each other as well. Stress occurring in those directions marked X and Y can be measured by the first 7a and the second sensor 7b mounted to the rail 3b respectively. It is evident to the skilled person that in some other embodiments there may be further sensors 7 mounted to that rail 3b or to the other rail 3a, for instance if the railroad track is tilted sideways with regards to the transport direction or if the deformation of the rail 3a shall be measured along an extended portion of the rail 3a which can make it necessary to increase the number of sensors 7.

Figure 5:
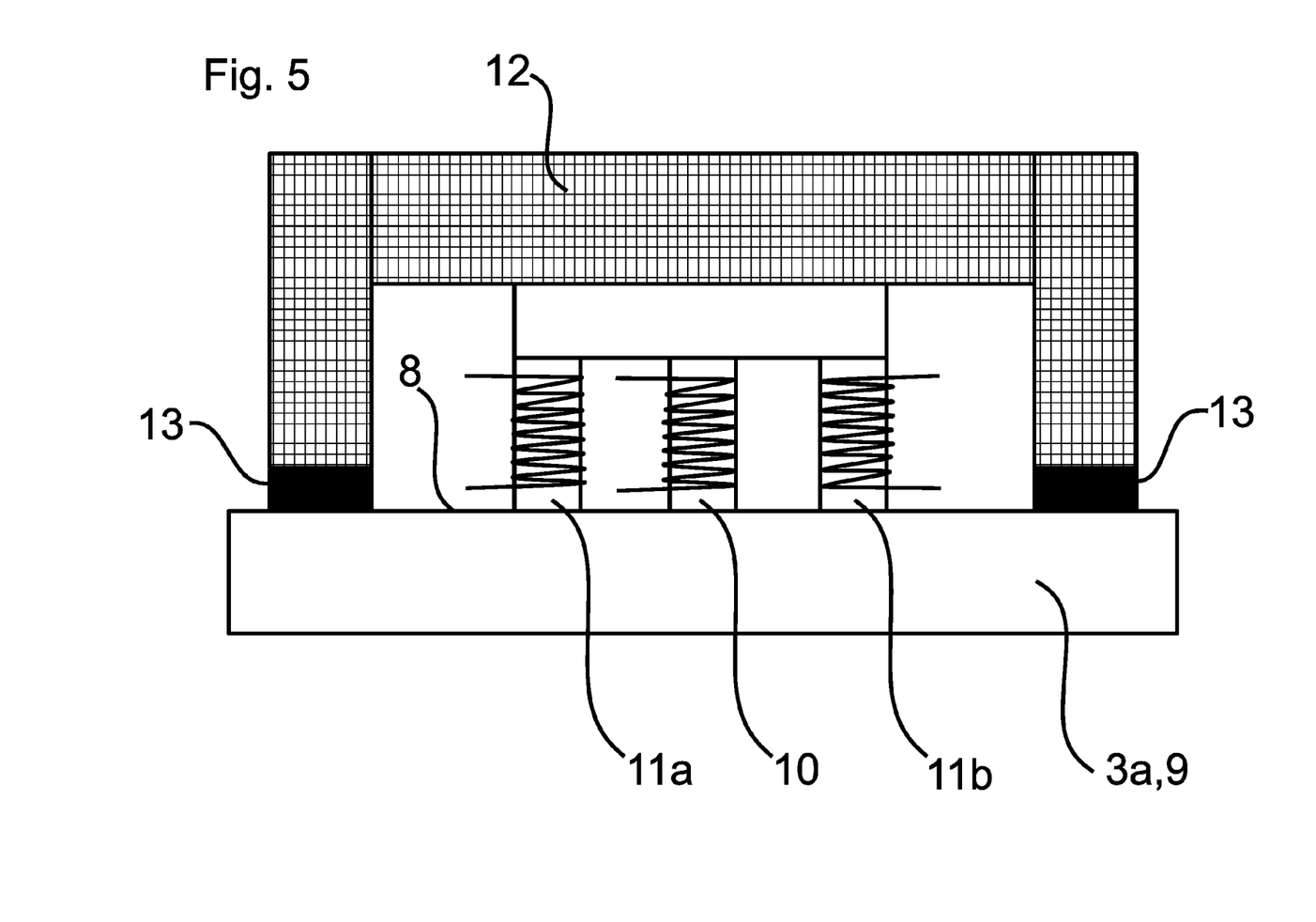
FIG. 5 shows an embodiment of an active magnetic sensor for use in an embodiment of the invention.
Figure 6:
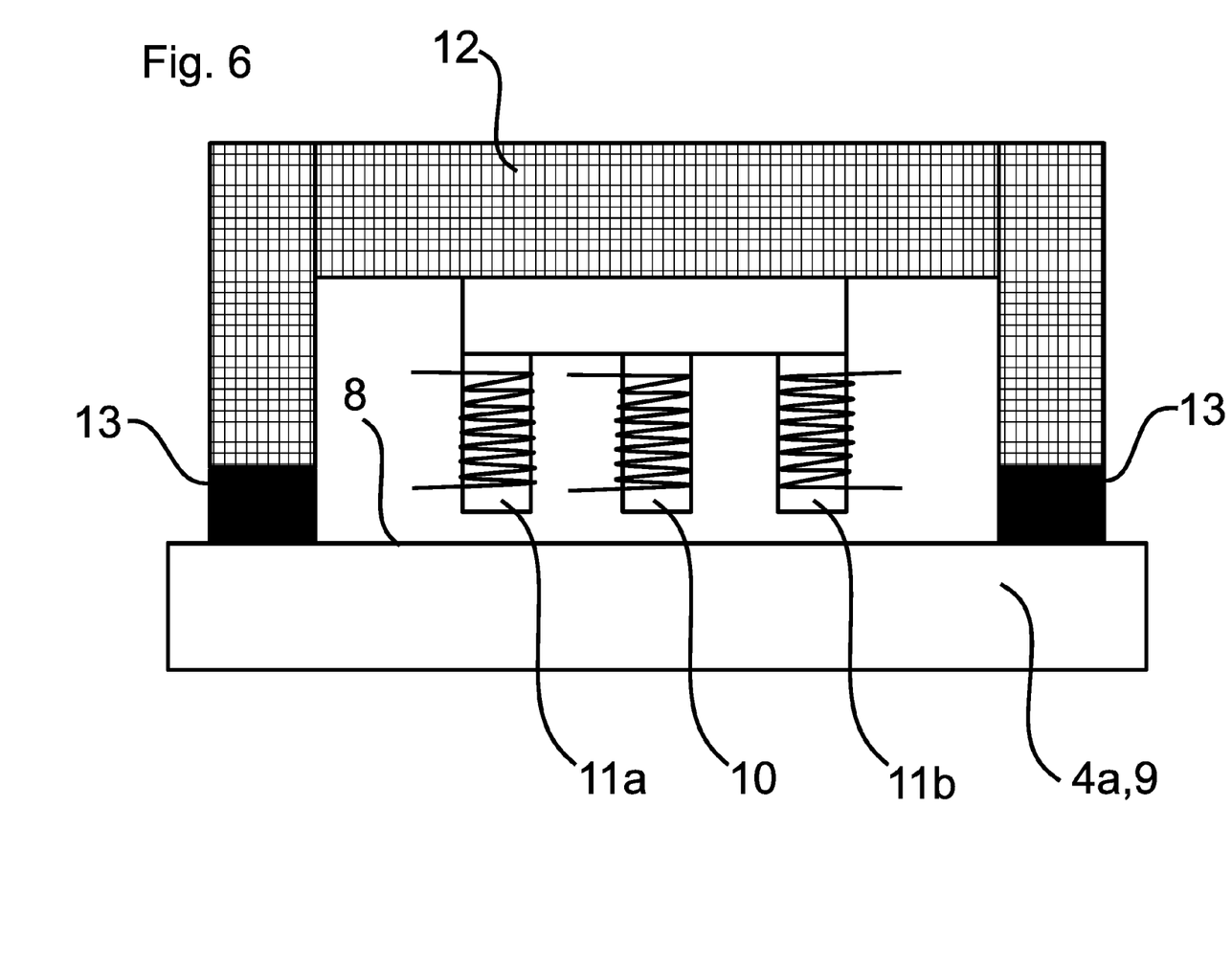
FIG. 6 shows another embodiment of an active magnetic sensor for use in an embodiment of the invention.

Regarding the sensors 7 to be used, schematic drawings are provided in FIGS. 5 and 6. Those sensors 7 are active sensors as described earlier in the document CN 101 36 88 42 A, having an excitation coil 10 for inducing a magnetic field into the rail 3a itself or into the support structure 4a, 4b of the rail 3a, and measurement coils 11a, 11b as part of measurement arrangements for picking up the magnetic field permeating the rail 3a. The sensor 7 used in the here described embodiments comprises an E-shaped integral iron core with three poles. The excitation coil 10 is wound around the central pole and by applying a current from a power source (not shown) a magnetic field is generated. The first and the second measurement coils 11a, 11b are pickup coils which can measure magnetic fields through induction and are wound around the two outer pole cores respectively, each to one of the outer poles of the E-shaped core. The magnetic field, which is actively generated by the excitation coil 10, induces a magnetic field in the ferromagnetic material of the rail 3a which in return is detected by the two measurement coils 11a, 11b. In the embodiment of the sensor 7 shown in FIG. 5, the sensor 7 comprises two measurement coils 11a, 11b for measuring the magnetic field, the coil surrounding a core and the core having a surface being in direct mechanical contact with the respective element of the transport rail system 1 whose magnetic property to be measured changes, in this case the rail 3a. Thus, the measurement arrangement has a surface, in this case the integral pole core, being in direct mechanical contact with the respective element of the transport rail system 1 whose magnetic property to be measured changes, in this case the rail 3a. Thereby, the rail 3a itself becomes part of the measurement arrangement.

In another embodiment, depicted in FIG. 6, the sensor 7 comprises a first and a second measurement coil 11a, 11b for measuring the magnetic property, the coils surrounding a core and the core having an air gap between it and the respective element of the transport rail system 1 whose magnetic property to be measured changes, in that case a support structure, specifically a ferromagnetic beam 4a consisting of ferromagnetic steel. In this case the pole of the core around which the excitation coil 10 is wound has an air gap to the beam 4a as well. In other embodiments though it might be advantageous that the pole of the excitation coil has a surface in direct contact with the element whose magnetic property to be measured changes while the poles of the core that are surrounded by the measurement coils 11a, 11b has an air gap to the beam 4a. If it is desired to use a passive measurement technology to omit the excitation coil 10 in the sensor 7 instead, the objective rail 3a, 3b or support structure 4a of the rail 3a, 3b has to be permanently magnetized.

In an alternative embodiment, not depicted in the figures, the sensor known from EP 2 397 830 A is applied instead of the sensor 7 described above. Thus, concerning the measurement process and the properties and settings of the sensor electronics, this document is incorporated into the present description by reference. The corpus to be measured when applying the sensor of EP 2 397 830 A to the present invention is either the rail 3a, 3b itself and/or the support structure 4a, 4b of the rail 3a, 3b. The properties and settings of the electronics of the sensor, for example the frequency of the magnetic field to be applied as described in said document, may also be applied to the sensor known from CN 101 36 88 42 A described above or to other sensors 7 adapted to measure a change of a magnetic property of the rail 3a, 3b itself or of a support structure 4a, 4b of the rail 3a, 3b.

The sensors 7 each are contained in a mechanical housing 12 which comprises permanent magnets 13 at its lateral ends which allow for quick and removable placement of the sensor modules to the rails 3a, 3b and support beams 4a, 4b or any ferromagnetic structure of the transport rail system to be tested.

The present invention provides an improved transport rail system 1 capable of detecting a weight of a rail vehicle 2. When a rail vehicle 2 travels along the rail 3a, the rail 3a and/or support beams 4a, 4b are bent and the resulting shear stress and strain change the magnetic susceptibility of the ferromagnetic material of the rails 3a, 3b or beams 4a, 4b. This means that the physical effect underlying the change of the magnetic property to be measured by the sensors is the inverse magnetostrictive effect, also known as Villari effect. The change of magnetic susceptibility causes a change of the magnetic field picked up by the sensor's measurement coils 11a, 11b. This change is proportional to the bending of the rail 3a, 3b or beam 4a, 4b and therefore to the mass of the rail vehicle 2. After proper calibration it is possible to measure the mass of the rail vehicle 2 reliably. The measurements can be conducted contactless and the necessary sensors 7 may be installed removably, so that measurements can be conducted more comfortably and at a lower cost. It becomes clear easily from the given embodiments that also embodiments are possible, where measurements of the magnetic field are conducted at both the rail 3a itself and at an element of its supporting structure, for example a beam 4a, 4b, a sleeper or a scaffold, simultaneously.

LIST OF REFERENCE NUMERALS

1 Transport rail system
2 Rail vehicle
3a, b Rail
4a, b Beam
5 Wall
6 Wheel
7a, b, c, d Sensor
8 Lateral surface
9 Base surface
10 Excitation coil
11a, b Measurement coil
12 Housing
13 Permanent magnets

The invention claimed is:

1. Transport rail system capable of detecting a weight of a rail vehicle, comprising:
   one or more rails, and
   at least one sensor for measuring a magnetic property,
   wherein the at least one sensor is adapted to measure a change of a magnetic property in order to determine a weight bearing on one or more of the rails, the change of the magnetic property being caused by stress exerted on the rail by said weight,
   wherein the at least one sensor is adapted to measure the change of a magnetic property of the rail itself and/or that the at least one sensor is adapted to measure the change of a magnetic property of a supporting structure of the rail, and
   wherein a physical effect underlying the change of the magnetic property to be measured by the at least one sensor is an inverse magnetostrictive effect.

2. Transport rail system according to claim 1, wherein the at lease one sensor comprises at least two sensors adapted to measure the change of the magnetic property.

3. Transport rail system according to claim 1, wherein the at least one sensor comprises at least two sensors adapted to measure the change of the magnetic property of the rail or the supporting structure of the rail, wherein the at least two sensors are mounted in a way to measure the change of the magnetic property in different measurement directions, the measurement directions having an angle between each other.

4. Transport rail system according to claim 1, wherein the at least one sensor comprises at least one measurement arrangement for measuring the magnetic property, the measurement arrangement having a surface of a coil or an integral pole core being in direct mechanical contact with the one or more rails or the supporting structure in which the magnetic property to be measured changes.

5. Transport rail system according to claim 1, wherein the at least one sensor comprises at least one measurement arrangement for measuring the magnetic property, the measurement arrangement having an air gap between the measurement arrangement and the one or more rails or the supporting structure in which the magnetic property to be measured changes.

6. Transport rail system according to claim 1, wherein the one or more rails have the supporting structure and the at least one sensor is adapted to measure the change of the magnetic property of the supporting structure of the rail caused by the stress exerted on the rail by said weight.

7. Transport rail system according to claim 1, wherein the one or more rails are mounted with the at least one sensor adapted to measure the change of the magnetic field property of the rail caused by the stress exerted on the rail by said weight.

8. Transport rail system according to claim 7, wherein the at least one sensor adapted to measure the change of the magnetic property caused by the stress exerted on the rail is arranged on the rail in an intermediate position between two supporting points of the supporting structure of the rail.

9. Transport rail system according to claim 1, wherein the one or more rails comprise at least two rails arranged in parallel to each other.

10. Transport rail system according to claim 1, wherein the transport rail system is a monorail system.

11. Transport rail system according to claim 1, wherein the one or more rails or the supporting structure in which the magnetic property changes due to the exerted stress comprises a ferromagnetic steel.

12. Transport rail system according to claim 1, wherein the one or more rails is permanently magnetized.

13. Transport rail system according to claim 1, wherein the at least one sensor for measuring the magnetic property of the transport rail system is removably mounted to the one or more rails or the supporting structure.

14. Transport rail system according to claim 1, wherein the at least one sensor comprises at least two sensors,
   wherein one of the at least two sensors is detachably attached to a first surface of the one or more rails, and another of the at least two sensors is detachably attached to a second surface of the one or more rails orthogonal to the first surface.

15. Transport rail system according to claim 14, wherein the at least two sensors each comprises
   a housing including a permanent magnet to attach to the one or more rails,
   an iron core housed in the housing and having a main body portion and three poles extending in parallel from the main body portion toward the one or more rails to form an E-shape,
   one excitation coil wound around a central pole of the three poles for inducing a magnetic field into the one or more rails, and two measurement coils each wound around the other poles of the three poles for picking up the magnetic field permeating the one or more rails.

16. Transport rail system according to claim 15, wherein the at least two sensors each further comprises an air gap between the three poles of the iron core and the one or more rails to not directly contact the one or more rails.

17. Transport rail system capable of detecting a weight of a rail vehicle, comprising:
one or more rails, and
at least two sensors for measuring a magnetic property,
wherein the at least two sensors are adapted to measure a change of a magnetic property in order to determine a weight bearing on one or more of the rails, the change of the magnetic property being caused by stress exerted on the rail by said weight,
wherein the at least two sensors are adapted to measure the change of a magnetic property of the rail itself and/or that the at least two sensors are adapted to measure the change of a magnetic property of a supporting structure of the rail, and
wherein the at least two sensors are mounted in a way to measure the change of the magnetic property in different measurement directions, the measurement directions having an angle between each other.

18. Transport rail system capable of detecting a weight of a rail vehicle, comprising:
one or more rails, and
at least one sensor for measuring a magnetic property,
wherein the at least one sensor is adapted to measure a change of a magnetic property in order to determine a weight bearing on one or more of the rails, the change of the magnetic property being caused by stress exerted on the rail by said weight,
wherein the at least one sensor is adapted to measure the change of a magnetic property of the rail itself and/or that the at least one sensor is adapted to measure the change of a magnetic property of a supporting structure of the rail, and
wherein the at least one sensor comprises at least one measurement arrangement for measuring the magnetic property, the measurement arrangement having an air gap between the measurement arrangement and the one or more rails or the supporting structure in which the magnetic property to be measured changes.

19. Transport rail system capable of detecting a weight of a rail vehicle, comprising:
one or more rails, and
at least one sensor for measuring a magnetic property,
wherein the at least one sensor is adapted to measure a change of a magnetic property in order to determine a weight bearing on one or more of the rails, the change of the magnetic property being caused by stress exerted on the rail by said weight,
wherein the at least one sensor is adapted to measure the change of a magnetic property of the rail itself and/or that the at least one sensor is adapted to measure the change of a magnetic property of a supporting structure of the rail, and
wherein the one or more rails is permanently magnetized.

20. Transport rail system capable of detecting a weight of a rail vehicle, comprising:
one or more rails, and
at least two sensors for measuring a magnetic property,
wherein the at least two sensors are adapted to measure a change of a magnetic property in order to determine a weight bearing on one or more of the rails, the change of the magnetic property being caused by stress exerted on the rail by said weight,
wherein the at least two sensors are adapted to measure the change of a magnetic property of the rail itself and/or that the at least two sensors are adapted to measure the change of a magnetic property of a supporting structure of the rail, and
wherein one of the at least two sensors is detachably attached to a first surface of the one or more rails, and another of the at least two sensors is detachably attached to a second surface of the one or more rails orthogonal to the first surface.

21. Transport rail system according to claim 20, wherein the at least two sensors each comprises
a housing including a permanent magnet to attach to the one or more rails,
an iron core housed in the housing and having a main body portion and three poles extending in parallel from the main body portion toward the one or more rails to form an E-shape,
one excitation coil wound around a central pole of the three poles for inducing a magnetic field into the one or more rails, and
two measurement coils each wound around the other poles of the three poles for picking up the magnetic field permeating the one or more rails.

22. Transport rail system according to claim 21, wherein the at least two sensors each further comprises an air gap between the three poles of the iron core and the one or more rails to not directly contact the one or more rails.

* * * * *